United States Patent [19]
Guithues et al.

[11] 4,153,441
[45] May 8, 1979

[54] PROCESS FOR MAKING MAGNESIUM POTASSIUM AMMONIUM PHOSPHATE

[75] Inventors: William L. Guithues, Memphis, Tenn.; Casimer C. Legal, Jr., Aurora, Colo.

[73] Assignee: W. R. Grace & Co., New York, N.Y.

[21] Appl. No.: 930,036

[22] Filed: Aug. 1, 1978

[51] Int. Cl.$^2$ ............................ C05B 7/00; C05B 9/00
[52] U.S. Cl. ........................................ 71/34; 423/306
[58] Field of Search ............... 423/306; 71/34, 43, 71/37, 41, 51, 33, 36

[56] References Cited

U.S. PATENT DOCUMENTS

| | | | |
|---|---|---|---|
| 3,125,411 | 3/1964 | Bridger et al. | 423/306 |
| 3,126,254 | 3/1964 | Salutsky et al. | 423/306 X |
| 3,141,732 | 7/1964 | McCullough et al. | 423/306 |
| 3,285,731 | 11/1966 | Salutsky et al. | 71/33 |
| 3,320,048 | 5/1967 | Legal et al. | 71/33 X |
| 3,476,510 | 11/1969 | Kern et al. | 423/306 |
| 3,490,892 | 1/1970 | Simpson | 71/34 |

FOREIGN PATENT DOCUMENTS

| | | | |
|---|---|---|---|
| 1924284 | 11/1970 | Fed. Rep. of Germany | 423/306 |
| 4708974 | 3/1972 | Japan | 71/41 |

*Primary Examiner*—Kenneth M. Schor
*Attorney, Agent, or Firm*—Charles L. Harness

[57] ABSTRACT

Process for making magnesium potassium ammonium phosphate, using ammonia, urea, potassium hydroxide, magnesium hydroxide, and phosphoric acid with specified maxima of iron, alumina, and sulfate.

2 Claims, 1 Drawing Figure

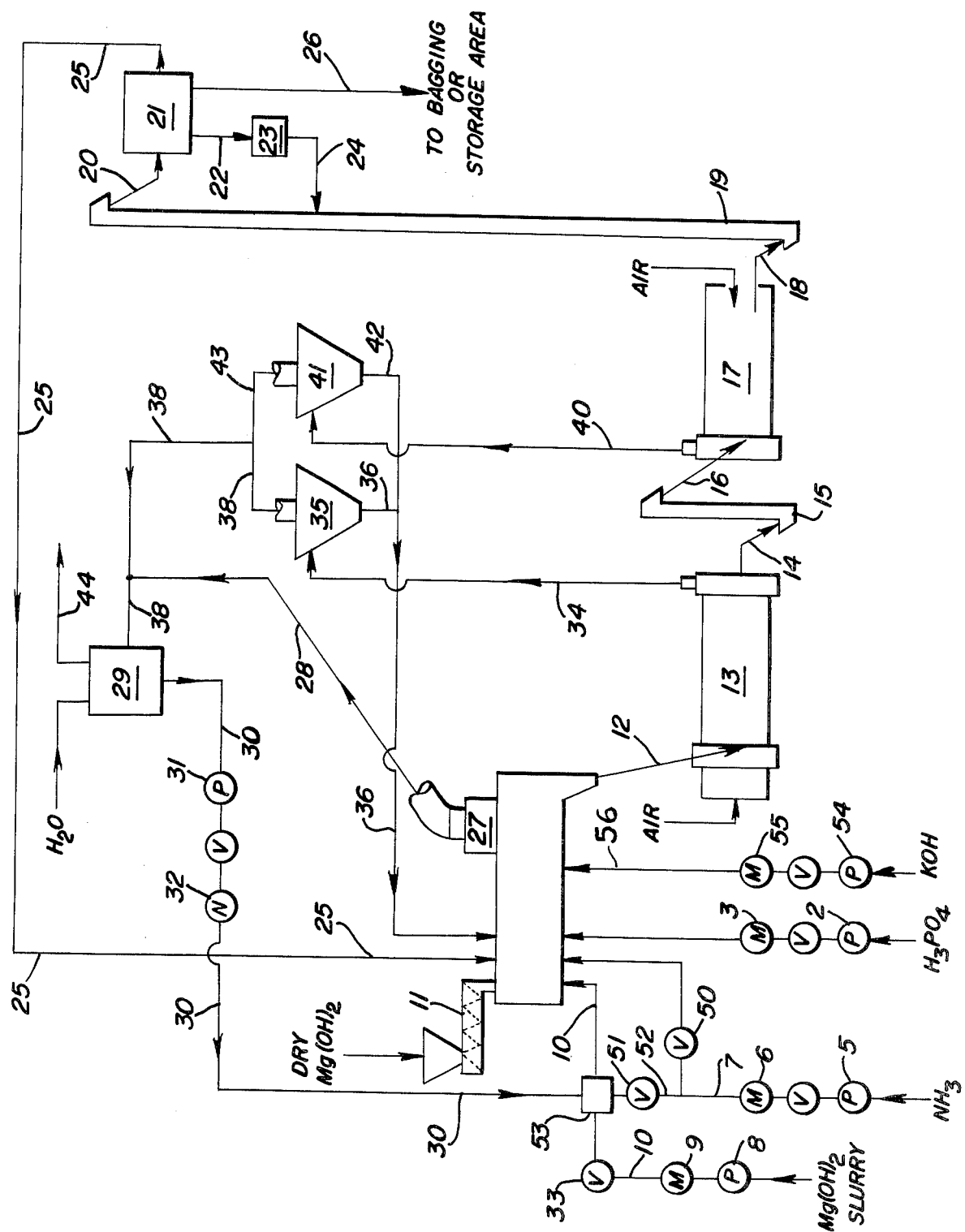

PROCESS FOR MAKING MAGNESIUM POTASSIUM AMMONIUM PHOSPHATE

This invention is directed to the manufacture of magnesium potassium ammonium phosphate. The process used is substantially the same as that of the prior art except that in lieu of furnace grade phosphoric acid or wet process acid as used in the prior art, this invention uses wet process phosphoric acid having a very specific analysis. Suitably, the acid has been prepared by solvent extraction. However, any acid meeting the analysis hereinafter specified is suitable.

PRIOR ART

The preparation of magnesium ammonium phosphate and/or magnesium potassium ammonium phosphate using wet process acid has been described in U.S. Pat. Nos. 3,392,007 and 3,459,530; for use of either wet process or furnace grade acids see U.S. Pat. Nos. 3,126,254 and 3,320,048. The use of reagent grade, wet process, or furnace grade acids is taught in U.S. Pat. No. 3,141,732.

Up to the present time commercial magnesium potassium ammonium phosphate has been made only with furnace grade phosphoric acid. Attempts to make this product using unmodified wet process phosphoric acid give a product excessively high in water-soluble nitrogen, with the consequence that the product has an excessive nitrogen loss soon after being spread on the ground. Furthermore the use of unmodified wet process phosphoric acid will not give a product that can be readily granulated. Hence wet process phosphoric acid, although it costs only about half as much as furnace grade phosphoric acid, has never been used to make a commercially acceptable grade of magnesium potassium ammonium phosphate.

Magnesium potassium ammonium phosphate, as is well known, is a non-burning fertilizer, slowly dissolving into the soil in the course of months. Commercial grades of this product, however, preferably provide a small amount of initial nitrogen solubility, whereby nitrogen can rapidly enter the soil of the initial application of this fertilizer. However, this initial nitrogen availability must be kept within maximal amounts, as otherwise the fertilizer may burn the plants. This maximum has been worked out for commercial acceptance over a period of years, and is known to be 2%.

Products made using furnace grade acid will readily provide this initial amount of water-soluble nitrogen without, however, exceeding this amount. Wet process phosphoric acid, on the other hand, gives a product that greatly exceeds the acceptable maximum for water-soluble nitrogen, i.e., about 2.6%, or more.

In summary, the invention involves an improvement in the method of making magnesium potassium ammonium phosphate having a water soluble nitrogen of not more than 2% by the steps of (a) preparing an aqueous reaction slurry by reacting together phosphoric acid of 40–61% $P_2O_5$, ammonia, urea, potassium hydroxide, and magnesium hydroxide in a reactor-granulating zone; (b) drying the resultant granules; (c) screening the granules to give granulated product and fines; (d) recycling the fines from (c) to the reactor-granulating zone in (a); in which the improvement comprises using, as the phosphoric acid reactant, phosphoric acid having the following analysis (basis 60% $P_2O_5$):

$SO_4$ as $H_2SO_4$, not more than about 3%
$Fe_2O_3$, not more than about 0.5%
$Al_2O_3$, not more than about 0.3%

Phosphoric acid meeting these requirements is available commercially. The type used in our work was a solvent extracted commercial grade. Analyses of this acid follow.

Table 1.

| | PHOSPHORIC ACID ANALYSIS[a] | | | |
|---|---|---|---|---|
| | Test #1 | Test #2 | Typical[b] | Preferred Range |
| Sp. Gr. | 1.714 | 1.712 | 1.715 | — |
| % $H_2O$ | 15.4 | 15.3 | 14.8 | 14.3–16.0 |
| % $P_2O_5$ | 59.8 | 59.4 | 59.15 | 59.0–61 |
| % CaO | 0.14 | 0.10 | — | — |
| % $SiO_2$ | 0.15 | 0.08 | — | — |
| % $Fe_2O_3$ | 0.46 | 0.41 | 0.34 | 0.3–0.5 |
| % $Al_2O_3$ | 0.12 | 0.12 | 0.28 | 0.1–0.3 |
| % F | 0.27 | 0.26 | 0.37 | 0.2–0.4 |
| % $H_2SO_4$ | 2.4 | 2.2 | 1.54 | 1.5–3.0 |
| % MgO | 0.33 | 0.33 | 0.93 | 0.3–1.0 |
| % $Na_2O$ | 0.05 | 0.06 | — | — |
| % $K_2O$ | 0.06 | 0.06 | — | — |
| % Solids | 0.46 | 0.34 | 0.1 | 0.1–0.5 |

[a] As received in tank cars for the large scale runs hereinafter described as Test #1 and Test #2.
[b] Analysis provided by source as typical.

LABORATORY SCALE RUN

This batch was made to determine water-soluble nitrogen. The results were not granulated.

Approximately five pounds of product were produced per run in this batch system. Following is the formula used per batch, based on the present commercial product:

| Batch Formula |
|---|
| 0.38 lbs $NH_3$ |
| 0.375 lbs urea-ammonia solution (43.3% urea, 56.7% $NH_4OH$) |
| 4.1 lbs phosphoric acid (56% $P_2O_5$) |
| 0.95 lbs KOH (45% solids) |
| 2.8 lbs $Mg(OH)_2$ (55% solids) |
| 2.2 lbs $H_2O$ |

First, magnesium hydroxide slurry was added by hand to a mixing chamber. Secondly the aqueous solution of urea and ammonium hydroxide was added. Third, the potassium hydroxide was added. Next the solvent extracted phosphoric acid was added. Next liquid ammonia and water were added to the mixing chamber. Mixing was continued for twenty minutes after which the mix was added to a blender. After passing through the blender, the mixture was dried in an oven at 100° C. Several runs were made. The products were analyzed for water-soluble nitrogen, and this was found generally to be less than 2%.

LARGE SCALE TESTS

The equipment and reactants were those used commercially to make commercial "Magamp" grade of magnesium potassium ammonium phosphate. This equipment and the reactants are described as follows:

The phosphoric acid used can analyze about 40–61% $P_2O_5$. Acid analyzing 59–61% is preferred. Such acid may require dilution with water to facilitate pumping, depending on mechanical facilities. If lower than 59% $P_2O_5$ it should meet the operable ranges given in Table 1, recalculated to a diluted basis. For example, with reference to 1.5% $H_2SO_4$ in the Table, given for, e.g., 59% acid, this can be, for a 40% acid, as low as (40/59) 1.5 or about 1% $H_2SO_4$.

While dry magnesium hydroxide can be used, an aqueous slurry of magnesium hydroxide in water is preferred. When dry magnesium hydroxide is fed, it is necessary to supply additional water (e.g., ca. 1.1–1.3 pounds of water per pound of dry magnesium hydroxide) to the reactor to obtain good conversion and satisfactory granulation of the product. The magnesium hydroxide can be reagent grade, but for economic reasons, commercial grade magnesium hydroxide analyzing about 95–98% $Mg(OH)_2$ is preferred. Slurries analyzing lower than 40% solids and about 30–40% $Mg(OH)$ can be used, but slurries analyzing about 46% $Mg(OH)_2$ are preferred. Either aqua ammonia ($NH_3$ dissolved in water) or liquid anhydrous ammonia can be used in the process of this invention, but liquid anhydrous ammonia is preferred.

In the process of this invention the reactants are preferably fed continuously into a reactor-granulator which is partially filled with solid magnesium potassium ammonium phosphate, while continuously removing magnesium potassium ammonium phosphate product from said reactor. (If the reactor is not a granulator, a granulator is placed immediately downstream of the reactor; a pug mill, mixer-granulator, or the like can be used as a granulator and the liquid raw materials can be injected into the bottom of the pugmill through a sparger system. The reactants coat the recycled stream of fines hereinafter referenced to form the granules. This is the preferred commercial embodiment.

When starting a run, the reactor is partially filled with magnesium potassium ammonium phosphate fines from a previous run. When starting the first run in a new plant, magnesium potassium ammonium phosphate, for placing in the reactor, can be made batchwise, recovered, dried, screened (e.g., to about minus 16 mesh), crushed, if necessary, and charged into the reactor.

When operating the process of this invention, solid granular magnesium potassium ammonium phosphate product is removed continuously, dried, screened, and recovered. Although not essential to the process, we prefer to cool the dried magnesium potassium ammonium phosphate before screening. Two fractions suitable for fertilizer application are obtained. One of said fractions passes a 3 mesh screen and is retained on a 6 mesh screen; the other passes a 6 mesh screen and is retained on a 16 mesh screen. Fines (i.e., particles minus 16 mesh) are recycled to the reactor, and oversized particles (i.e., those particles retained on a 3 mesh screen) are crushed and returned to the screens.

The process is substantially identical to that disclosed in U.S. Pat No. 3,320,048, except that KOH is added and the phosphoric acid used is of intermediate purity between the wet process and furnace grades there disclosed. The diagram of the FIGURE is based on the FIGURE of U.S. Pat. No. 3,320,048, with minor changes, e.g., to show use of KOH.

The herein process is described with reference to the accompanying drawing as follows:

The raw materials ($H_3PO_4$, $NH_3$, $Mg(OH)_2$, and KOH are blended together in reactor-granulator 1 where said materials are reacted to form the fertilizer granules. Phosphoric acid is fed into said reactor, from an acid storage tank (not shown), via pump 2, flow meter 3, and line 4. Ammonia, from a storage tank (not shown), enters the reactor via pump 5, flow meter 6, and line 7. Magnesium hydroxide slurry is fed into the reactor, from a storage tank (not shown), via pump 8, flow meter 9, and line 10. Alternatively, dry magnesium hydroxide can be used as a source of magnesium. When dry magnesium hydroxide is used, said magnesium hydroxide is fed from a storage bin (not shown) to dry feeder 11 which can be a screw conveyor, belt conveyor, or the like, and water is fed into the system via pump 8, flow meter 9, and line 10. Aqueous potassium hydroxide enters reactor-granulator 1 via pump 54, meter 55, and line 56. Granules of magnesium potassium ammonium phosphate pass from reactor-granulator 1 to dryer 13 via chute 12; dried granules exit dryer 13 via chute 14 and enter elevator 15 from which said granules pass via chute 16 to cooler 17. (If desired, the capacity of the plant can be increased by replacing cooler 17 with a second dryer.) The cooled granules pass via chute 18, elevator 19 and chute 20 to screening device 21. The granules are screened into 4 size ranges. These are: (1) oversize particles (plus 3 mesh); (2) fines (minus 16 mesh); and (3) two lots of product size particles. The two lots of product size particles are: (a) those particles which pass a 3 mesh screen and are retained on a 6 mesh screen; and (b) those particles which pass a 6 mesh screen and are retained on a 16 mesh screen. The oversize particles pass from screening device 21, via chute 22 to crushing device, or crusher, 23 from which the crushed particles are recycled to elevator 19 via chute 24. Both lots of product size particles pass from screening device 21 to a bagging and storage area (not shown), where the product is recovered, via two chutes 26 (only one of which is shown). Fine particles pass from screen, or screening device, 21 to chute 25 which recycles said fine particles to reactor-granulator 1. Provision is made in the plant (but not shown in the drawing) to recycle part or all of the product size particles to the reactor-granulator via chute 25. As shown in the drawing, air flow through the dryer is concurrent with the flow of the granules, however, if desired, the process can be modified to use counter current air flow. Air, dust and a small amount of escaping ammonia vapor leave dryer 13 via line 34 and pass to dust separator 35 where most dust particles drop to the bottom of said separator and pass from said separator to reactor-granulator 1 via chute 36. Air and ammonia vapor pass from dust separator 35 via line 38 to water scrubber 29. Air flow through cooler 17 is shown in the drawing as counter current to the flow of the solid particles passing through the said cooler; however, if desired, concurrent air flow can be used. Air from the cooler plus some dust particles and a small amount of escaping ammonia vapor pass, via line 40, to dust separator 41 where most particles of dust drop to the bottom and pass from said separator via chute 42 to chute 36, and then to reactor-granulator 1. Air and ammonia vapor exit from dust separator 41 via line 43 and pass to line 38 and thence to water scrubber 29. Simultaneously, air and ammonia vapor escaping from reactor-granulator 1 are circulated, via hood 27, to line 28 and then to water scrubber 29, via line 38. Water scrubbed air leaves scrubber 29 via line 44. Water from the scrubber contains ammonia dissolved from the scrubbed air and a very small amount of magnesium potassium ammonium potassium phosphate present as a suspension of solid particles. Said water-ammonia-magnesium potassium ammonium phosphate mixture passes from said scrubber via line 30, pump 31, and flow meter 32. Line 30 feeds into line 10 via mixing device 53 which can be an in line mixer or blender, a mixing cross, or two closely spaced mixing T's positioned in series. Other mixing devices will be readily apparent to those skilled in the art. Mixing device 53 is positioned in line 10 between valve 33 and reactor-granulator 1. If desired, the ammonia and magnesium hydroxide slurry can be premixed in mixing device 53 by closing valve 50 and opening valve 51, thereby feeding ammonia, from line 7, into said mixing device via line 52.

Referring back to dryer 13, it is essential that the granules be dried to a moisture content of no more than 3.5%. Above that level the granules are soft and tend to break down.

We prefer to use a pug mill as reactor-granulator; however, numerous other suitable devices, including rotary mixers, rotary granulators, and the like, will be readily apparent to those skilled in the art. The dryer shown in the drawing is a rotary dryer. Numerous other types of drying apparatus suitable for use in the process of this invention will be readily apparent to those skilled in the art; among such devices are tunnel dryers, mechanically agitated dryers, vacuum dryers, and the like. The dryer can be directly heated or indirectly heated. When using indirect heat steam coils or electric cables wrapped around the device or inserted therein can provide suitable source of heat. With direct heating the flame formed by burning a suitable liquid, gas, or solid fuel can be used. Other means of applying heat will be readily apparent to those skilled in the art. The cooler shown in the drawing is a rotary cooler; however, other types of coolers including conveyor belt coolers, mechanically agitated coolers, and the like, will be readily apparent to those skilled in the art. The dust separators shown in the drawing are cyclone separators. Numerous other types of separators which can be used in the process of this invention will be readily apparent to those skilled in the art. Among such separators are bag filters, electrical precipitators, and special air filters. As shown in the drawing, solid materials are transported from one apparatus unit to the next via chutes or elevators. It will be readily apparent to those skilled in the art that other devices such as conveyor belts, screw conveyors, and the like can be used in place of chutes and elevators. The screening device used to separate the dried and cooled magnesium ammonium phosphate granules into product, oversized particles, and fine particles can be vibrating screens, shaking screens, trommels, and the like. The crusher, or crushing device, can be a coffee mill type crusher, a stamp mill, hammer mill, roll crusher, or the like.

Anhydrous liquid ammonia, potassium hydroxide, magnesium hydroxide slurry, urea solution, and solvent extracted wet process phosphoric acid were reacted using the above described procedure, using amounts given in the following table.

| Raw Material | Lbs./Ton of Dry Product |
|---|---|
| $NH_3$ | 171 |
| KOH | 383 |
| MgO Slurry | 1,138 |
| Urea solution[1] | 128 |
| Phosphoric acid (54% $P_2O_5$)[2] | 1,730 |

[1] 43.4% urea, 30.5% $NH_3$, balance water.
[2] This acid as received analyzed about 59% $P_2O_5$. For ease of pumping it was diluted with water to 54%.

Materials made as described in Tests 1 and 2 were found to have acceptable water-soluble nitrogen and to have excellent granulation characteristics. In granulation tests, it was found desirable to dry the granules down to a water content of about 3.5%. Excess water was found to give a friable product.

In these two large scale runs several hours of semi-continuous production was required to reach equilibrium so as to be able consistently to produce a product meeting specifications, and particularly meeting water soluble nitrogen maximum of 2%.

In Test No. 1, commercial facilities as above described were used for a short production run. The run was started at about 1:30 p.m. on the first day. It took until 11:30 a.m. the next day before chemical analysis was acceptable. The run was discontinued at 5 p.m. on this second day. During this period nearly 30 tons of product were made on a semi-continuous basis, with temporary shut-downs for periodic product analysis for an average of 2182 lb./hr. for the 27.5 hour run. However, during periods of actual production, granules were produced at the normal production rate for the plant, i.e., at 5 TPH. See Table 2.

Test No. 2 was operated both before and after the interval reported in Table 3. However, in the beginning the KOH meter malfunctioned, giving low KOH analyses, and in the final hours the dryer was operating at too low a temperature, resulting in moisture contents of 7–8.55%, which made the granules friable. Therefore only the period for which the process was operated to give commercially acceptable product is reported.

Full data are given in the two Tables following.

Table 2

| | CHEMICAL ANALYSES - TEST RUN #1 | | | | | | |
|---|---|---|---|---|---|---|---|
| | 824–3 5 pm-Grab | 924–4 5 pm–9 pm | 824.5 9 pm–Grab | 824.6 12 m–7:30 am | 824–7 7:30am–Grab | 825.5 11:30am–5pm | 825.6 5pm–Grab |
| Moisture | 3.05 | 2.30 | 2.00 | 3.45 | 3.30 | 3.10 | 3.07 |
| Total Nitrogen | 6.40 | 6.65 | 6.65 | 7.10 | 7.40 | 7.20 | 7.05 |
| Water Sol. Nit. | 2.50 | 2.55 | 2.30 | 2.20 | 2.10 | 2.10 | 1.95 |
| Ammoniacal Nit. | 5.65 | 5.90 | 6.10 | 6.15 | 6.30 | 6.25 | 6.25 |
| Urea Nit. | 0.75 | 0.75 | 0.55 | 0.95 | 1.00 | 0.95 | 0.80 |
| Total $P_2O_5$ | 45.50 | 45.50 | 45.00 | 43.30 | 42.80 | 43.00 | 43.10 |
| Insol. $P_2O_5$ | 1.30 | 1.40 | 1.35 | 1.30 | 1.10 | 1.20 | 1.20 |
| APA | 44.20 | 44.10 | 43.65 | 42.00 | 41.70 | 41.80 | 41.90 |
| $K_2O$ - AOAC[1] | 5.30 | 5.45 | 5.35 | 5.75 | 6.05 | 6.05 | 5.90 |
| $K_2O$ - Total | 6.20 | 6.30 | 6.15 | 6.70 | 7.00 | 6.95 | 6.80 |
| MgO | 19.50 | 20.30 | 21.00 | 20.00 | 19.80 | 19.40 | 19.75 |

[1] Assn. of Official Analytical Chemists

Table 3

| | CHEMICAL ANALYSES - TEST RUN #2 | | | |
|---|---|---|---|---|
| | 922-1 1:30P-5:30P | 922-2 5:30P-Grab | 922-3 7:55P-12 M | 922-4 12M-Grab |
| Moisture | 3.30 | 2.50 | 2.60 | 3.00 |
| Total Nitrogen | 7.30 | 7.40 | 7.50 | 7.50 |
| Water Sol. Nitrogen | 2.05 | 2.00 | 2.05 | 2.10 |
| Ammoniacal Nitrogen | 6.50 | 6.60 | 6.60 | 6.65 |
| Urea Nitrogen | 0.80 | 0.80 | 0.90 | 0.85 |

Table 3-continued
CHEMICAL ANALYSES - TEST RUN #2

|  | 922-1 1:30P-5:30P | 922-2 5:30P- Grab | 922-3 7:55P- 12 M | 922-4 12M- Grab |
|---|---|---|---|---|
| Total $P_2O_5$ | 43.30 | 43.20 | 43.30 | 43.30 |
| Insol. $P_2O_5$ | 1.20 | 1.20 | 1.20 | 1.00 |
| APA | 42.10 | 42.00 | 42.10 | 42.00 |
| $K_2O$ - AOAC[1] | 5.85 | 6.20 | 6.40 | 6.15 |
| $K_2O$ - Total | 6.76 | 7.12 | 7.30 | 7.05 |
| MgO | 20.30 | 20.20 | 20.10 | 20.20 |

[1] Assn. of Official Analytical Chemists

What is claimed is:

1. In the method of making magnesium potassium ammonium phosphate having a water soluble nitrogen of not more than 2% by the steps of
   (a) preparing an aqueous reaction slurry by reacting together phosphoric acid of 40–61% $P_2O_5$, ammonia, urea, potassium hydroxide, and magnesium hydroxide in a reactor-granulating zone, thereby to form granules;
   (b) screening the said granules to give granulated product and fines;
   (c) recycling the fines from (b) to the granulating zone in (a);
the improvement comprising using, as the phosphoric acid reactant, phosphoric acid which is not furnace grade, but has the following analysis (basis, 60% $P_2O_5$):
   $SO_4$ (as $H_2SO_4$) not more than about 3%
   $Fe_2O_3$, not more than about 0.5%
   $Al_2O_3$, not more than about 0.3%.

2. Method according to claim 1 in which the phosphoric acid has the following analysis:

|  | % |
|---|---|
| $H_2O$ | 14.3–16.0 |
| $P_2O_5$ | 59.0–61.0 |
| $Fe_2O_3$ | 0.3–0.5 |
| $Al_2O_3$ | 0.1–0.3 |
| F | 0.2–0.4 |
| $H_2SO_4$ | 1.5–3.0 |
| MgO | 0.3–1.0 |
| Solids | 0.1–0.5. |

* * * * *